United States Patent
Sharma et al.

(10) Patent No.: US 6,909,692 B1
(45) Date of Patent: Jun. 21, 2005

(54) METHOD AND APPARATUS FOR SELF-ADJUSTABLE DESIGN FOR HANDLING EVENT FLOWS

(75) Inventors: Sandeep Sharma, Allen, TX (US); Wei Wei, Irving, TX (US); Phillip Heisler, Plano, TX (US)

(73) Assignee: Alcatel, Paris (FR)

( * ) Notice: Subject to any disclaimer, the term of this patent is extended or adjusted under 35 U.S.C. 154(b) by 969 days.

(21) Appl. No.: 09/668,897

(22) Filed: Sep. 22, 2000

Related U.S. Application Data

(60) Provisional application No. 60/173,059, filed on Dec. 24, 1999.

(51) Int. Cl.$^7$ .................................................. H04J 3/14
(52) U.S. Cl. ........................ 370/232; 370/235; 340/3.5; 340/7.29
(58) Field of Search ................................. 342/457, 465; 370/225, 228, 229, 232, 235, 236.1, 236.2, 238, 241, 252, 254, 351, 356, 410, 419, 222, 230, 230.1, 231–236, 253; 379/9.03, 9.04, 27.08, 221.07; 398/9, 17, 33; 709/223–225, 235, 202; 713/500, 502; 340/3.1, 3.42, 3.5, 7.29, 505–507, 500, 517–521, 529

(56) References Cited

U.S. PATENT DOCUMENTS

| | | | | |
|---|---|---|---|---|
| 5,388,189 A | * | 2/1995 | Kung | 706/45 |
| 5,408,218 A | * | 4/1995 | Svedberg et al. | 340/507 |
| 5,905,711 A | | 5/1999 | Chiussi et al. | |
| 6,018,515 A | * | 1/2000 | Sorber | 370/229 |
| 6,212,376 B1 | * | 4/2001 | Hong et al. | 455/423 |
| 6,456,590 B1 | * | 9/2002 | Ren et al. | 370/229 |
| 6,484,200 B1 | * | 11/2002 | Angal et al. | 709/224 |
| 6,513,129 B1 | * | 1/2003 | Tentij et al. | 714/4 |

FOREIGN PATENT DOCUMENTS

| | | |
|---|---|---|
| EP | 0 515 296 A1 | 11/1992 |
| WO | WO 96/24899 | 8/1996 |

* cited by examiner

*Primary Examiner*—Wellington Chin
*Assistant Examiner*—John Shew
(74) *Attorney, Agent, or Firm*—James A. Harrison; Jessica W. Smith; V. Lawrence Sewell

(57) ABSTRACT

The present invention contemplates an apparatus and a method for limiting the number of specified messages placed onto a network thus to improve network performance. An element management system, upon detecting that a defined threshold has been exceeded for specified types of messages, determines which network element is generating the greatest number of such messages. Thereafter, the element management system instructs the network element that is generating the largest number of alarm messages to cease transmitting a specified type of alarm message. In an alternate embodiment of the invention, if the event flow rate is still too high, the element management system may instruct the cross connect network element to stop sending all threshold types of alarms. Finally, if the event flow rate is still too high, the element management system may cause all QoS alarms from the one network element to not be transmitted. Alternatively, the threshold alarms from other network elements may be muted for a period to reduce the overall event flow rate. For each embodiment, the element management system suspends the flow of messages for a defined period of time. For example, in one preferred embodiment, the select type of QoS signal is muted for a period of 600 seconds. In an alternate embodiment of the invention, a network element is allowed to start transmitting the suspended QoS signals if the overall alarm rate for the suspended QoS signals falls below a lower threshold value.

18 Claims, 7 Drawing Sheets

METHOD AND APPARATUS FOR SELF-ADJUSTABLE DESIGN FOR HANDLING EVENT FLOWS

PRIORITY STATEMENT UNDER 35 U.S.C. § 119(e) and 37 C.F.R. § 1.78

This non-provisional application claims priority based upon the following prior U.S. provisional patent application entitled: "*Method and Apparatus for Self-Adjustable Design for Handling Event Flows*", Ser. No. 60/173,059, filed Dec. 24, 1999, in the names of: Sandeep Sharma, Wei Wei, and Phillip Heisler.

BACKGROUND

1. Technical Field

The present invention relates generally to data transmission in data communication networks, by way of example, the synchronous optical networks, (SONET networks) and Synchronous Digital Hierarchy networks (SDH networks) and more particularly to the control of alarm messages within a network to prevent the excessive generation of alarm messages from degrading network performance.

2. Related Art

New networks and information exchange capabilities that were unimaginable even in recent times are being developed and implemented in a way that impacts businesses and individuals in a significant way. For example, desktop computers may now be integrated with wireless radio telephones to allow the transmission of information from the computer to a destination by way of a land line communication network and then by way of a wireless communication network.

The recent explosion of the internet is creating the capability and desire for networks of all types to be integrated and coupled to exchange data signals carrying varying types of information. In many cases, the same data will be transported through a local area network prior to being delivered to the internet. Thus, by way of example, a digital signal can be transported from a source through a local area network and through the internet to a final destination. Moreover, within the internet portion itself, there may be a need to transport the user data through a backbone data transfer port infrastructure, by way of example, through a fiber optic ring network. The aforementioned SONET and SDH networks play a key role in providing a backbone data transport infrastructure.

Generally speaking, the internet itself is in essence a collection of many large and small computer networks that are coupled together over high speed backbone data links such as T-1, T-3, OC-1 and OC-3. Stated differently, the internet is a network of networks. As a result of the creation of the internet, worldwide access may be achieved. People and their equipment may now communicate from most any civilized point to another in a fast and relatively inexpensive medium.

In order to make communication devices created by companies throughout the world compatible with each other to create local area networks and worldwide networks such as the internet protocols and standards are often defined. These protocols and standards are used to guide the design of the communication devices, and more specifically, to guide the design of the operating logic in software within the devices. While communication devices that are designed in view of these standards do not always follow the suggested models exactly, they are usually compatible with the protocol-defined interfaces (physical and logical).

Regarding its physical aspects, the internet is a packet switched network that is currently based on a group of protocols for exchanging data. For example, a transmission control protocol/internet protocol (TCP/IP) is a connection-oriented protocol that first establishes connection between two computer systems that are to exchange data. The digital information is then broken into data packets having a defined format. The packets are attached to headers that are for containing control and address information and are transmitted through the internet and through the back hall infrastructures.

Many of the common backbone data transport systems utilized include time division multiplexed (TDM) double ring transmission systems. Double ring TDM systems are generally known, especially for fiber optic communication networks. In order to maintain transmission in the event of a fault on one of the channels of the communication links, it is typically common to find ring transmission systems in which transmissions occur in two directions. Specifically, transmissions occur in one direction through all of the nodes in the ring in a working path in through an opposite direction in a protection path.

The protection path is, traditionally, a redundant path for transmitting signals in a failure condition. Examples of fiber optic TDM systems include the SONET and SDH double ring fiber optic communication systems used in North American and Europe, respectively. As a result of the internet, many types of networks that traditionally have been independent of one another are now being integrated so that a user of one type of device may relay messages to another type of device.

By way of example, networks are being integrated to allow a user of a computer to generate a message that is transmitted to a recipient's cellular phone. By way of example, the sender might enter a message upon his computer, then use the public switch telephone network to access the internet wherein the message is transmitted to a paging company that in turn utilizes a cellular network to deliver a text message to the recipient.

In the described example, three different networks were utilized to deliver the message. The internet formed the backbone network that tied the public switched telephone network to the wireless network to deliver the message. Moreover, had that user been on a computer terminal that is part of a corporate LAN, by way of example, then the message would have had to be transmitted through the corporate LAN prior to being transmitted over the public switch telephone network and then the internet and then the wireless network.

Because the internet and demand for internet access has exploded, the aforementioned data transport networks for providing a data backhauling have been developed to conduct large numbers of communication channels and large amounts of data. Fiber optic networks, in particular, are very attractive for backhauling data because they have achieved very high capacity rates. One fiber optic strand alone can carry dozens of times more data than a traditional wire line. Because a fiber optic cable comprises a bundle of many such strands, the data throughput capacity of modem fiber optic networks is enormous.

As these networks evolve and progress, the control of the networks is developed at many different layers or levels of abstraction. For example, the OSI model defines seven (7) layers of protocol for data transport and control of the same. Needless to say, the software and systems that are required to merely control such large amounts of data form their own networks that are also very sophisticated and have significant feedback mechanisms to enable precise control.

For one example, an element management system may receive feedback on network conditions from up to 250 cross connect systems that are used for routing and controlling data flow. Each of the 250 cross connect systems, in turn, may control up to 8,000 logical communication lines in a data pipeline network. Thus, significant amounts of error messages may be generated when a problem is detected by one of the 250 cross connect devices.

More specifically, network management systems can operate under degraded conditions or even crash when an event occurs that causes at least one network element to generate large numbers of messages, alarms and other signals to the event. The results from a surge of alarms (hereinafter event flow) may lead to problems ranging from system degradation to actual system crash. What is needed therefore is a system and method for preventing an event flow from degrading or crashing the system or network.

SUMMARY OF THE INVENTION

To overcome the shortcomings of the prior systems and their operations, the present invention contemplates an apparatus and a method for limiting the number of specified messages placed onto a network thus to improve network performance. More specifically, in the occurrence of an event that prompts a network element to generate a large number of noncritical alarms, an element management system, upon detecting that a defined threshold has been exceeded for specified types of messages, determines which network element is generating the greatest number of such messages. Thereafter, the element management system then instructs the network element that is generating the largest number of alarm messages to cease transmitting a specified type of alarm message.

By way of example, in some cross connect network elements, there are a great number of quality of service oriented signals and alarms that may be generated by the cross connect network element. Among these, there are 33 signals, for one particular cross connect network element, that specify when a defined threshold has been reached. In addition to the threshold type of quality of service signals, there are others as well.

Accordingly, the invention contemplates having the element management system that instruct the cross connect network elements to suspend transmitting specific types of QoS threshold alarms. In an alternate embodiment of the invention, if the event flow rate is still too high, the element management system may instruct the cross connect network element to stop sending all threshold types of alarms. Finally, if the event flow rate is still too high, the element management system may cause all QoS alarms from the one network element to not be transmitted. Alternatively, the threshold alarms from other network elements may be muted for a period to reduce the overall event flow rate. For each of these scenarios, the element management system suspends the flow of messages for a defined period of time. For example, in one preferred embodiment, the select type of QoS signal is muted for a period of 600 seconds. In an alternate embodiment of the invention, a network element is allowed to start transmitting the suspended QoS signals if the overall alarm rate for the suspended QoS signals falls below a lower threshold value. In the preferred embodiment of the invention, the upper threshold is 10 events per second for all network elements or 1 per second for any one network element. In this alternate embodiment, the lower threshold is 3 events per second for all network elements.

DETAILED DESCRIPTION OF THE DRAWINGS

Figure 1A:
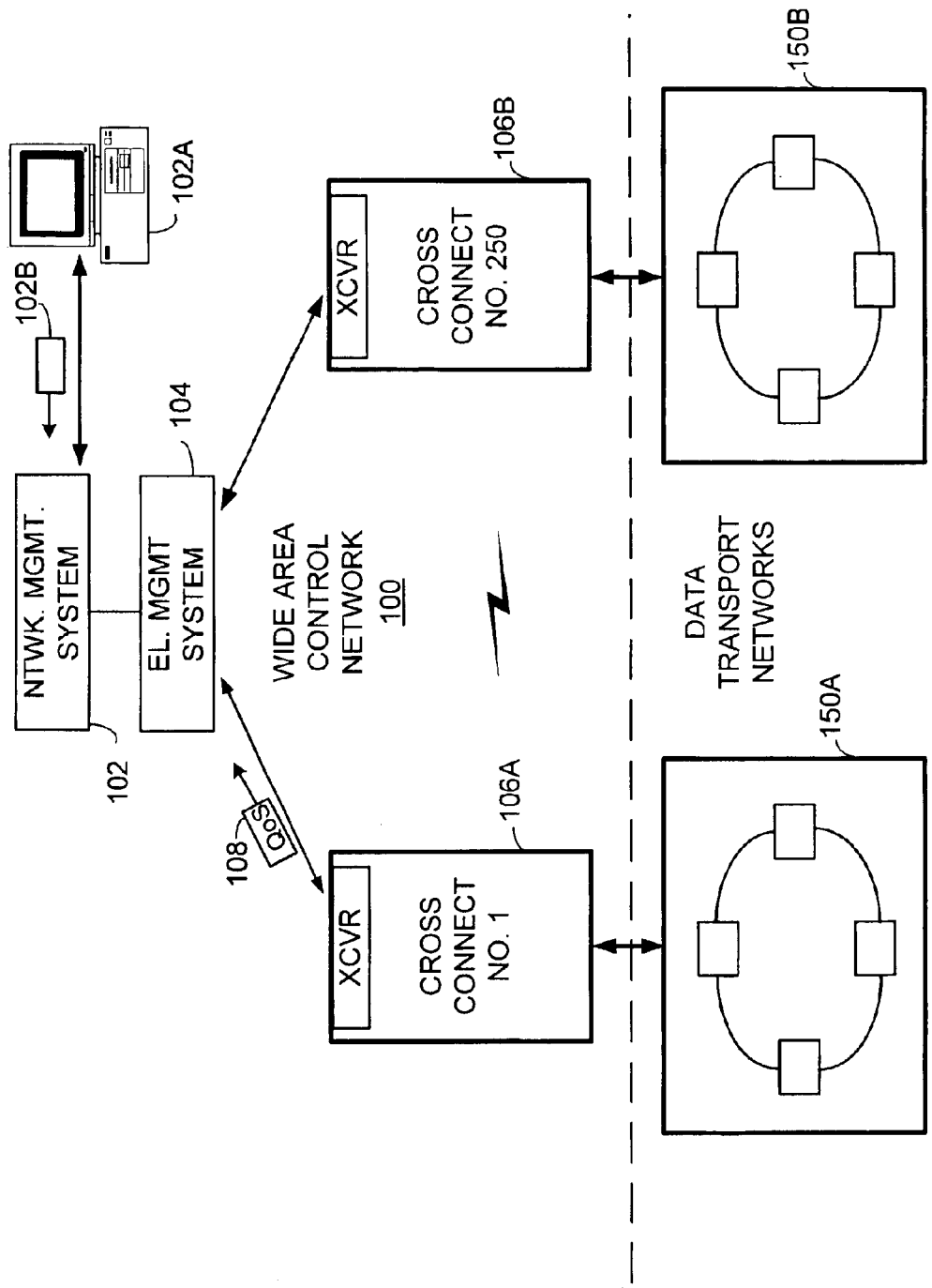
FIGS. 1A and 1B are functional block diagrams illustrating a plurality of data transport networks and a control network for controlling the data transport within the data transport networks according to a preferred embodiment of the invention.
Figure 1B:
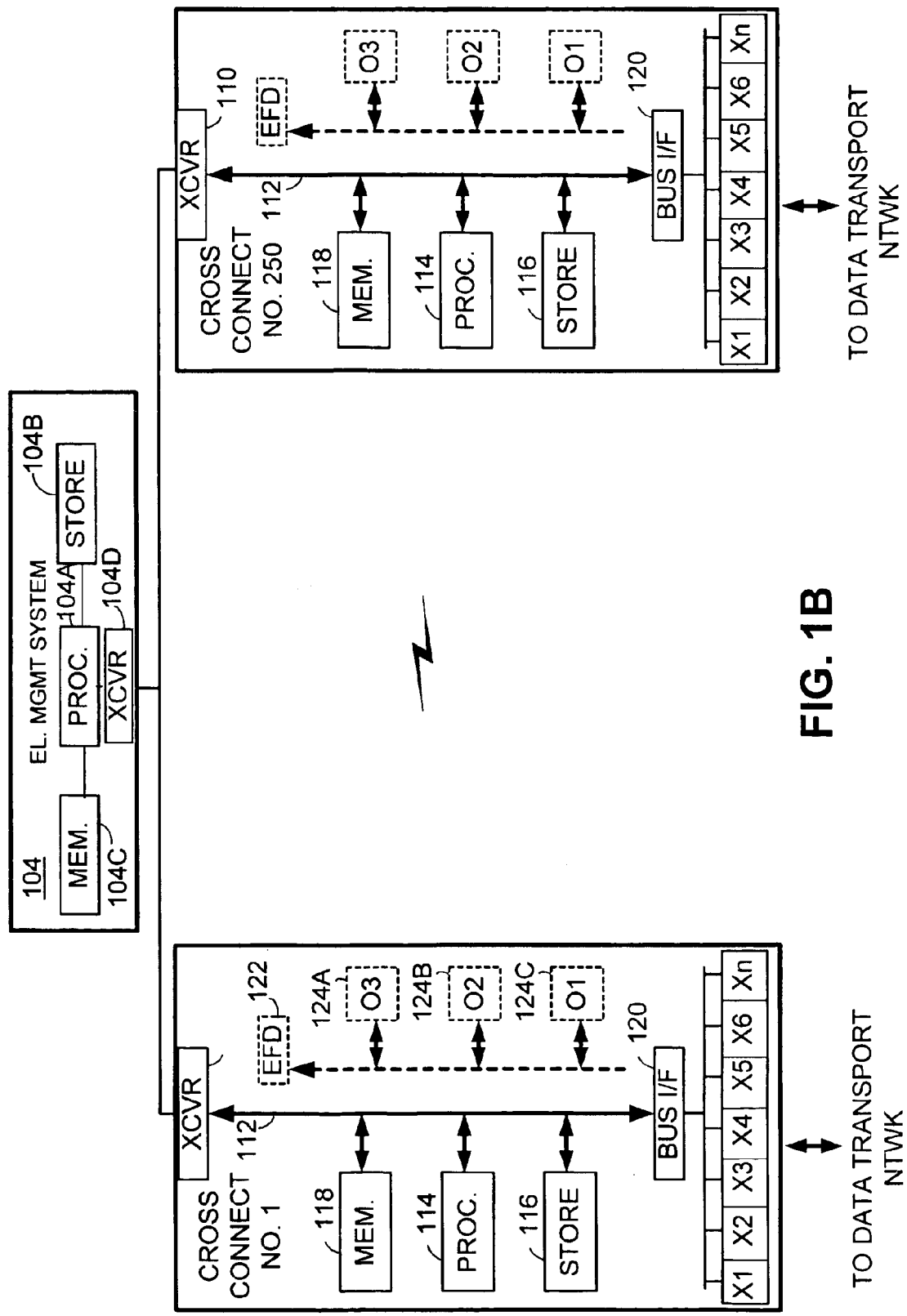

FIGS. 1A and 1B are functional block diagrams illustrating a plurality of data transport networks and a control network for controlling the data flow within the data transport networks. Referring now to FIGS. 1A and 1B, a wide area control network 100 is coupled to communicate with a plurality of data transport networks 150. More specifically, a network management system 102 is coupled to exchange control signals with an element management system 104. Element management system 104 is coupled to exchange control signals and to receive network information from each of a plurality of cross connect network elements. For example, cross connect network element 106A is shown transmitting a quality of service signal 108 to element management system 104.

Element management system 104 includes a processor 104A, a store 104B and a memory 104C and a transceiver port 104D. Transceiver port 104D is for enabling the element management system 104 to communicate with a plurality of network elements 106. For example, in one embodiment of element management system 104, transceiver 104D is operable to communicate with 250 network elements 106 over a wide area network. Processor 104A is operable to execute computer instructions stored within store 104B. The computer instructions 104B define the operation and operational logic of the element management system 104 according to the present invention. For example, the computer instructions within store 104B define the logic to prompt one or more network elements to stop transmitting alarms as described herein. More particularly, the method steps described in each of the following figures that are performed by an element management system 104 are defined in the computer instructions stored within store 104B. For example, each method step relating to the logic for determining which alarms are to be muted and for how long is defined in store 104B.

Each element management system 104, in the described embodiment, is capable of communicating with and up to 250 cross connect network elements over wide area control network 100. As may be seen, therefore, the element management systems must be capable of communicating with many cross connect network elements at once. Should an event occur to cause some of the cross connect network elements 106A to generate a large number of QoS signals 108, the network operation may become degraded especially if there are many other ongoing communications.

Each of the cross connect network elements 106A and 106B are connected to their own data transport networks 150A and 150B, respectively. Each of the data transport networks 150A and 150B shown here in FIGS. 1A and 1B is a dual ring SONET network. It is understood, of course, that the invention is not limited to any particular data transport network and, more specifically, to dual ring SONET networks.

Continuing to refer to FIGS. 1A and 1B, cross connect network element 106A includes an interface port 110 for communicating with element management system 104. Additionally, cross connect network element 106A includes an internal bus to enable communications between a processor 114, a store 116, and a memory 118. Store 112 is a memory device, typically formed of a hard disk, that includes computer instructions that define the operational logic for cross connect network element 106A. Memory 118 is formed, in the preferred embodiment, of a disk as well. Because its purpose is for storing data on a temporary basis, however, other known types of memory may be used including random access memory. Processor 110 communicates with store 116 over internal bus 116 to obtain and execute the stored computer instructions. Additionally, processor 114 communicates with memory 118 over bus 116 to place data within the memory that is to be used as part of the operations. Internal bus 116 also is coupled to bus interface 120 which serves to interface a large plurality of ports X1 through Xn. Network element 106A communicates with cross connect network elements.

As stated before, one cross connect network element may control up to 8,000 virtual communication links. Accordingly, significant interface capabilities are required between the cross connect network element 106A and the data transport network 150A.

The computer instructions stored within store 116 also define logic to create an event forwarding discriminator 122 and a plurality of managed objects. Herein FIGS. 1A and 1B, managed objects O1, O2 and O3 are shown at 124A–124C, respectively. Each managed object represents a specified function or grouping of computer instructions that perform a specified function. As is known by those skilled in the art, each of the managed objects O1, O2 and O3 as well as the event forwarding discriminator (EFD) 122 are addressable as distinct devices of a network. Thus, element management system 104 is capable of transmitting specified commands to the EFD or to the managed objects 124A–124C.

In operation, processor 114 interprets a command having a specified address, for example, one that is intended for EFD 122, and then executes an algorithm that is called by or relates to the specified address given in the command from element management system 104. By way of example, if element management system 104 generates a message to instruct the EFD to filter a specified type of quality of service signal in response to receiving too many quality of service alarms, processor 114 will execute a series of computer instructions that achieve the effect desired by element management system 104. In the described embodiment, each of the managed objects send alarms to EFD 122. EFD 122 analyzes the received alarms and decides which alarms to forward to the network element management system 104. Thus, element management system 104 may generate instructions for a specified managed object such as managed object 124A or for the EFD 122 to stop sending specified types of alarms.

Store 116 also includes computer instructions to limit the transmission of specified types of quality of service signals or alarms under specified conditions. For example, in one embodiment, the computer instructions stored within store 116 enable the cross connect network element 106 to store in memory a specified quality of service signal when so instructed by the element management system 104. If the cross connect network element 106 continues to send too many alarms, then the logic within store 116 also is capable of muting all quality of service threshold alarms, and then if necessary, all alarms. In the preferred embodiment, each alarm that is prevented from being transmitted over a bus to element management system 104 is stored in memory 118 until such time that element management system 104 requests an upload of all stored alarms. Thus, as may be seen, store 116 also includes computer instructions that define logic for responding to a request to upload stored alarms.

Continuing to refer to FIGS. 1A and 1B, it may be seen that the network management system 102 is coupled to an operator console 102a. The operator console 102a is for allowing an individual to interact with the network management system 102 to specify the upper and lower thresholds that trigger the state changes as defined herein. For example, an operator may enter, for some embodiments, just the upper threshold value that triggers a 600 second suspension. For example, if the operator determines that the event flow rate is still typically too high after 600 seconds, the operator might choose to increase that value to another number, by way of example, 900 seconds. Alternatively, if the operator determines that 600 seconds always is enough, then she might experiment by reducing the suspension period to a lower number such as 300 seconds. Accordingly, the ability to specify the suspension period allows the system to be tuned and adjusted to a period of time that typically works well but that minimizes the suspension period. Alternatively, the operator console 102 may also enable then operator to specify the actual threshold values if the operator determines that they may be changed. Thus, by way of example, the upper threshold value may be set to an event flow rate of 30 events per second instead of 10 events per second. Thus, the selected threshold values and/or the selected suspension period values are transmitted in a system parameters signal 102b from console 102a to network management system 102 which in turn transmits a signal containing the information of signal 102b to element management system 104.

Figure 2:
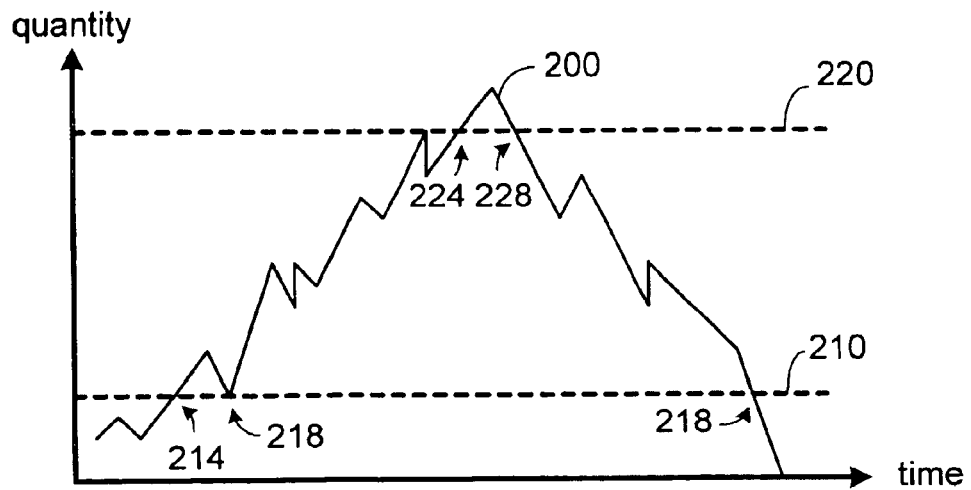
FIG. 2 includes a curve that illustrates network operation according to one embodiment of the invention in terms of the rate of alarm transmissions versus time.

FIG. 2 includes a curve that illustrates network operation according to one embodiment of the invention in terms of the quantity of alarm transmissions versus time. More specifically, FIG. 2 illustrates an event rate flow for quality of service messages. In modem networks, a very large number of quality of service messages are often defined to enable an element management system to properly control the various networks. For example, there are 33 types of threshold crossing alerts that are defined for this one existing cross connect network element. Thus, for exemplary purposes, FIG. 2 illustrates a curve that represents the rate of the threshold crossing alerts that are received by the element management system 104 of FIG. 1.

As may be seen, referring to FIG. 2, a curve 200 illustrates an increase and then decrease of the event flow rate with respect to time. Initially, curve 200 crosses a lower threshold 210 at point 214. Thereafter, the event rate peaks and decreases and just touches the lower threshold at point 216 before it begins a climb toward the upper threshold 220. The event curve 200 eventually crosses the upper threshold at 224 while increasing in rate. Thereafter, the event rate peaks and decreases to zero. Along the way, however, the event rate crosses the upper threshold at 228. In the preferred embodiment of the invention, the network element is commanded to suspend the generation of threshold crossing alerts for a period of 600 seconds once the curve crosses threshold 220 at point 224. As may be seen from referring to FIG. 2, as the event flow rate continues to zero, it crosses the lower threshold 210 at point 218.

In an alternate embodiment of the invention, the crossing of the lower threshold 210 prompts the element management system to generate a message to the cross connect network element 106 that is in a suspended mode of operation to transition back to a normal mode of operation. In the example herein, the upper threshold is defined as ten events per second while the lower threshold is defined to be three events per second from all of the network elements. It is to be understood that these threshold definitions may readily be varied.

Figure 3:
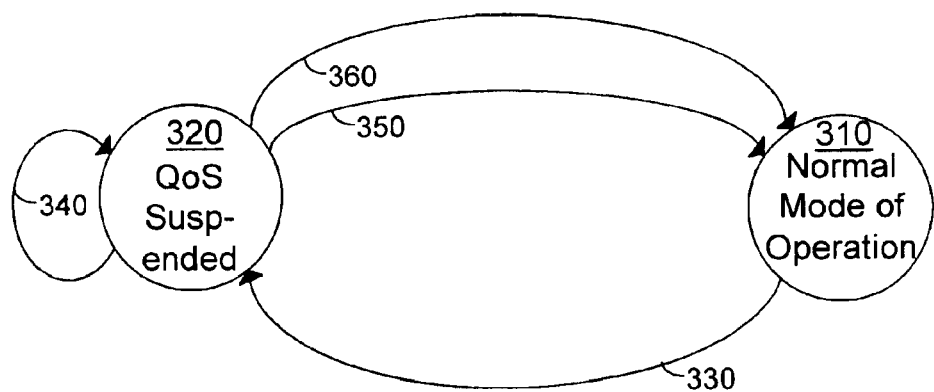
FIG. 3 is a state transition diagram illustrating two modes of operation for a cross connect network element within a wide area control network 100 of FIG. 1.

FIG. 3 is a state transition diagram illustrating two modes of operation for a cross connect network element within a wide area control network 100 of FIG. 1. In a normal mode of operation, namely state 310, a cross connect network element generates and transmits event information to element management system 104 whenever a specified event is realized. For example, among the hundreds of different types of alarms and messages that may be generated, any one of a large group of quality service messages may be transmitted. Moreover, even within the group of quality of service messages, there are 33 different types of threshold crossing alerts for an existing and known type of cross connect network element. Thus, in the normal mode of operation 310, the cross connect network element 106 continues to generate all 33 types of threshold crossing alerts as necessary.

If, on the other hand, a transition event occurs, namely that a certain event flow rate from the cross connect network elements to the element management systems 104 has been exceeded (event 330), then the cross connect network element that is transmitting the greatest number of the specified alarms is suspended for a period of time from generating more alarms. At this point, the system transitions to state 320.

For example, in the preferred embodiment, if a cross connect network element 106A is generating the greatest number of threshold crossing alerts in comparison to all other cross connect network elements, and if the number of threshold crossing alerts received by element management system 104 exceeds 10 per second from the entire group of cross connect network elements, then the offending cross connect network element 106 is placed into a suspended mode of operation, or state 320. In alternate embodiments of the invention, different types of quality of service messages at different rates or different types of alarms at different rates may be used herein.

Once a cross connect network element is placed into a suspended mode of operation, or state 320, it is no longer allowed to generate a specified type of alarm for a specified period. Rather, the cross connect network element stores the specified type of alarm into memory for uploading at a latter time. By way of example, our cross connect network element 106A might be prevented from generating and transmitting all 33 types of threshold crossing alerts for a period of 600 seconds.

In the preferred embodiment of the invention, a cross connect network element, or state 320 only exits the suspended mode of operation 320 when 600 seconds have expired. Thus, event 350, which is the expiration of the 600 seconds, causes the cross connect network element to transition from a suspended mode of operation, or state 320, to a normal mode of operation, or state 310. Thus, event 340 of FIG. 3 merely illustrates that the cross connect network element 106A stays within the suspended mode of operation 320 while it has been less than 600 seconds since it entered that mode of operation.

In an alternate embodiment of the invention, cross connect network element may transition from the suspended mode of operation, or state 320, to normal mode of operation, or state 310, when the event flow rate reaches or exceeds the lower threshold illustrated in FIG. 2. By way of example, if the number of threshold crossing alerts from the entire network drops or reaches an event flow rate of 3 per second, the cross connect network element 106A transitions to the normal mode of operation 310 (event 360).

It is to be understood that the upper and lower thresholds that trigger the changes in modes of operation from the normal mode of operation 310 to the suspended mode of operation 320 may be varied.

Figure 4:
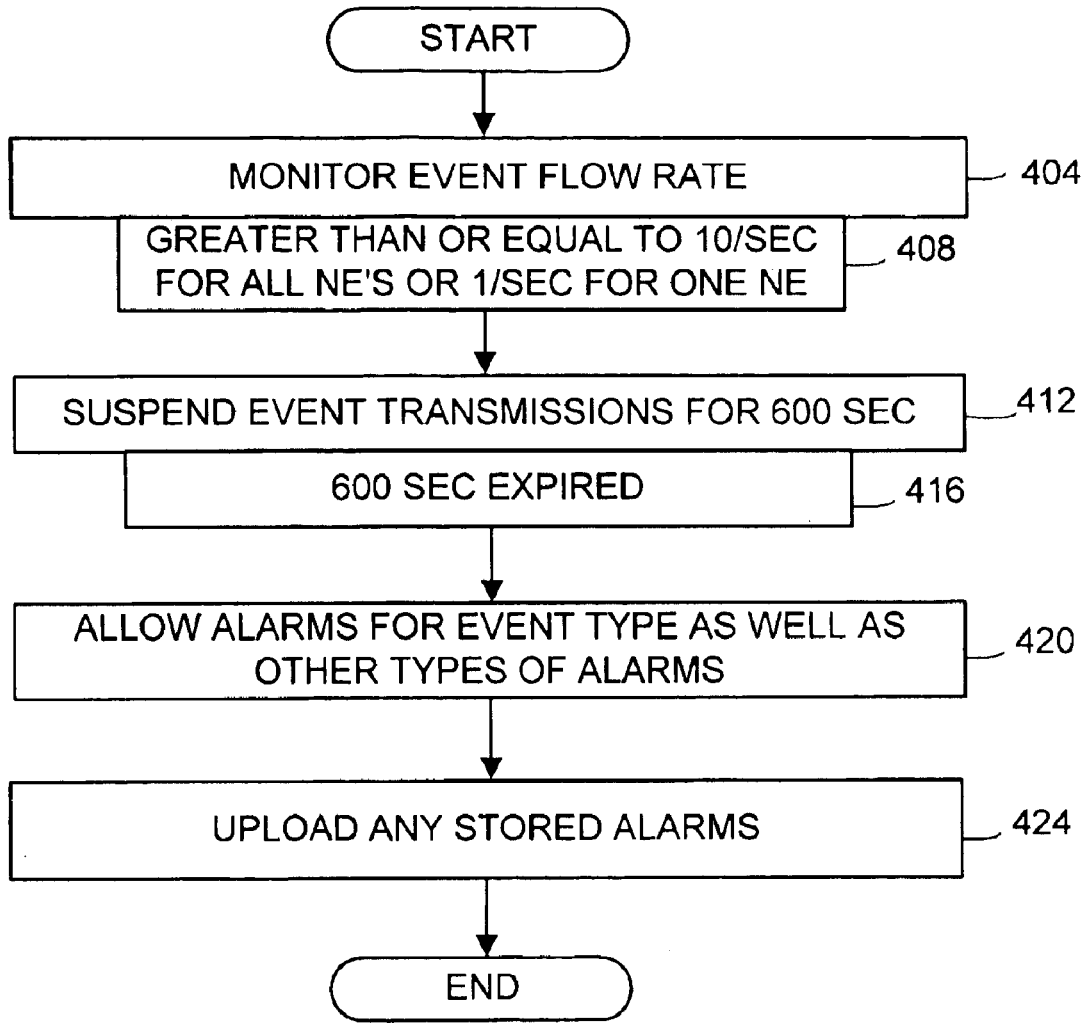
FIG. 4 is a flow chart illustrating a method for controlling an event rate to avoid system degradation according to a preferred embodiment of the invention.

FIG. 4 is a flow chart illustrating a method for controlling an event rate to avoid system degradation according to a preferred embodiment of the invention. Referring now to FIG. 4, the element management system 104 monitors the event rate from all of the cross connect network elements (step 404). While monitoring the event rate, the element management system 104 determines whenever the event rate is greater than or equal to a fixed number for a fixed period of time. In the preferred embodiment, the element management system determines when the event rate is greater than or equal to 10 per second from all of the network elements or 1 per second from any one network element (step 408).

Once the element management system determines that the event rate has reached or exceeded 10 per second from all of the network elements or 1 per second for any one network element, it suspends the alarms for the event type for a fixed period of time (step 412). In the preferred embodiment of the invention, the element management system suspends the alarms that relate to the specified event type for a period of 600 seconds by transmitting a signal to EFD 122 to prompt it to "change filters" so as to filter specified types of alarms. In an alternate embodiment, a command is sent to merely restrict the flow of a specified alarm. The element management system then determines when 600 seconds has expired (step 416) and allows the cross connect network element that was instructed to cease transmitting specified alarm types to transition to a normal mode of operation where alarms for the event type are allowed (step 420). Once the system is operating in a normal mode of operation, including the cross connect network element that previously was in a suspended mode of operation, the element management system uploads all alarms that were stored during the suspension period (step 424).

Figure 5:
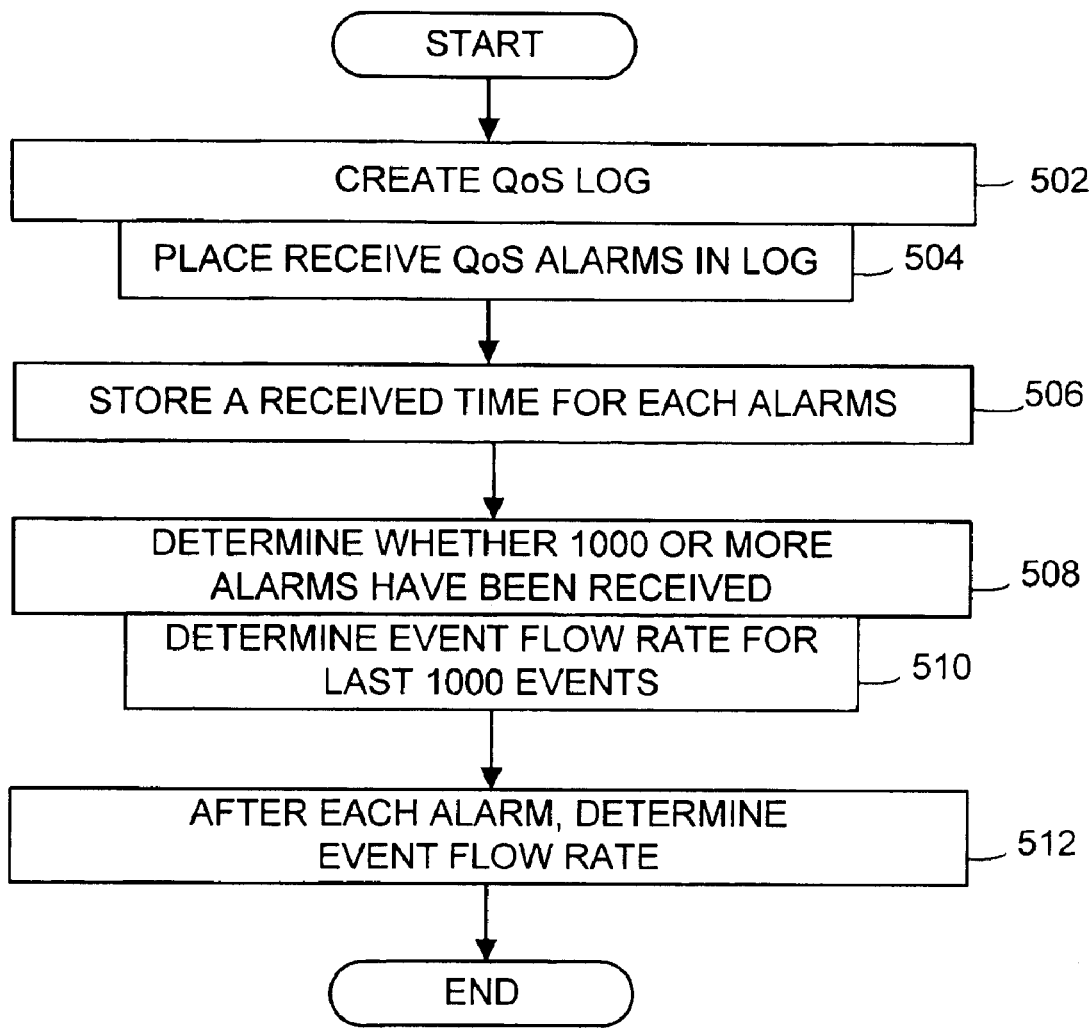
FIG. 5 is a flow chart illustrating the method in which the element management system monitors the event rate according to one embodiment of the invention.

FIG. 5 is a flow chart illustrating the method in which the element management system monitors the event rate according to one embodiment of the invention. First, the element management system, by way of example, element management system 104 of FIG. 1, creates a QoS log of events (step 502). In the preferred embodiment, the event log includes quality of service parameters and more specifically, threshold crossing alerts. Thus, as the specified threshold crossing alerts (quality of service alarms) are received, they are placed into the log created in step 502 (step 504).

In addition to logging the alarm by type, the element management system also records a time value that corresponds to each logged alarm (step 506). The time value allows, at a minimum, the element management system to determine the relative difference in time of alarms. Thus, in one embodiment, the time value is merely a numerical value representing the amount of time that has elapsed since the last logged entry was made. In an alternate embodiment, the time value reflects the actual system time that the alarm was received. The purpose of storing time values is to enable the element management system to determine an event flow rate.

The number of stored events is monitored until it is determined that approximately 1000 have been recorded (step 508). Once the element management system has recorded 1000 entries in the log, it determines the event flow rate for the last events (step 510).

Thereafter, after each alarm is received, once a total of 1000 entries have been placed into the log, the element management system recalculates the event flow rate as a part of monitoring it as described in step 404 and determining when the event rate has reached a specified threshold (step 512).

Figure 6:
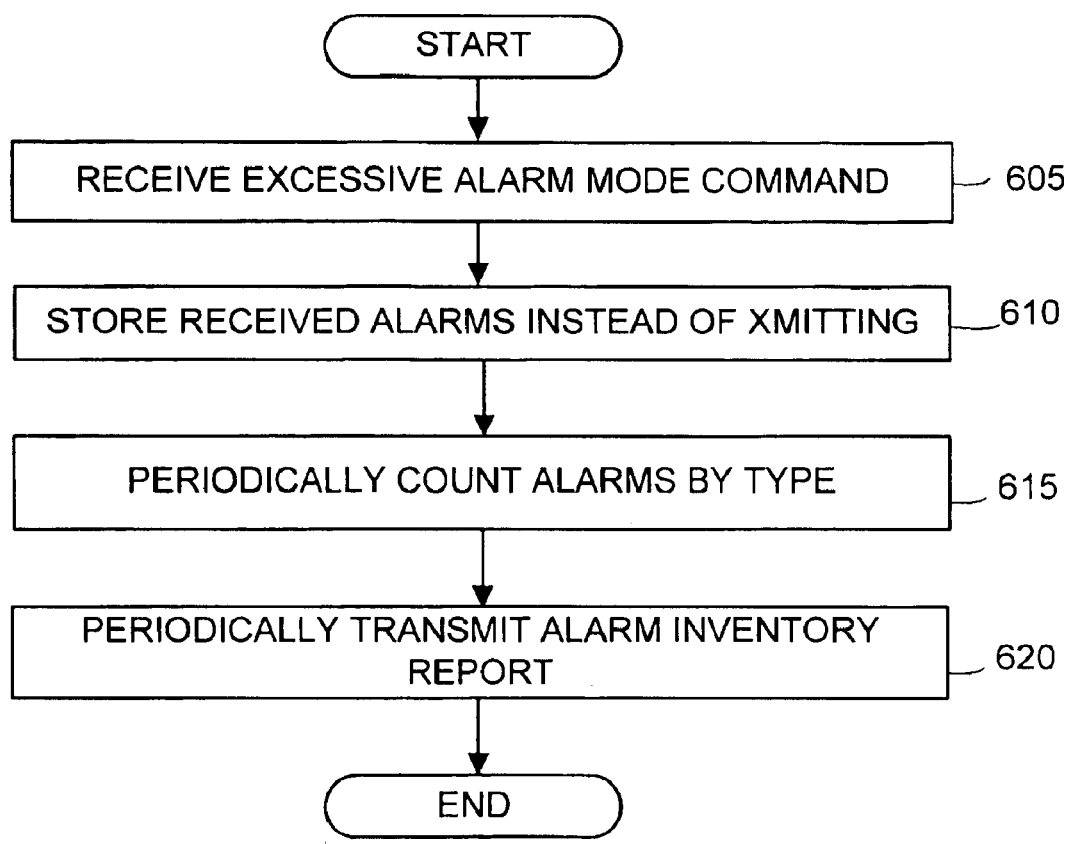
FIG. 6 is a flow chart illustrating an alternate embodiment for reducing the rate of event flows, namely the rate of QoS alarms that are transmitted to the element management system.

FIG. 6 is a flow chart illustrating an alternate embodiment for reducing the rate of event flows, namely the rate of QoS alarms that are transmitted to the element management system. The method disclosed in FIG. 6 is a method performed in a cross connect network element. First, the cross connect network element receives an indication that the element management system is receiving an excessive number of alarms (step 605).

Typically, a message is received from the element management system indicating that the message flow rate is too high. In the preferred embodiment of the invention, a signal named "off Threshold_Alarms" is used to indicate that the alarm flow rate is too high and that the cross connect network element is to go into a suspended mode of operation. In this alternate embodiment of FIG. 6, however, the cross connect network element responds differently to the specified signal. First, it builds a list of alarms instead of transmitting them (step 610). This step also exists in all preferred embodiments of the invention. Thereafter, the cross connect network element periodically counts the alarms by type that are within the list (step 615). Then, on occasion, the cross connect network element transmits an alarm inventory report to the element management system (step 620). For example, in one embodiment, the cross connect network element may be programmed to transmit the alarm inventory report once every second.

Figure 7:
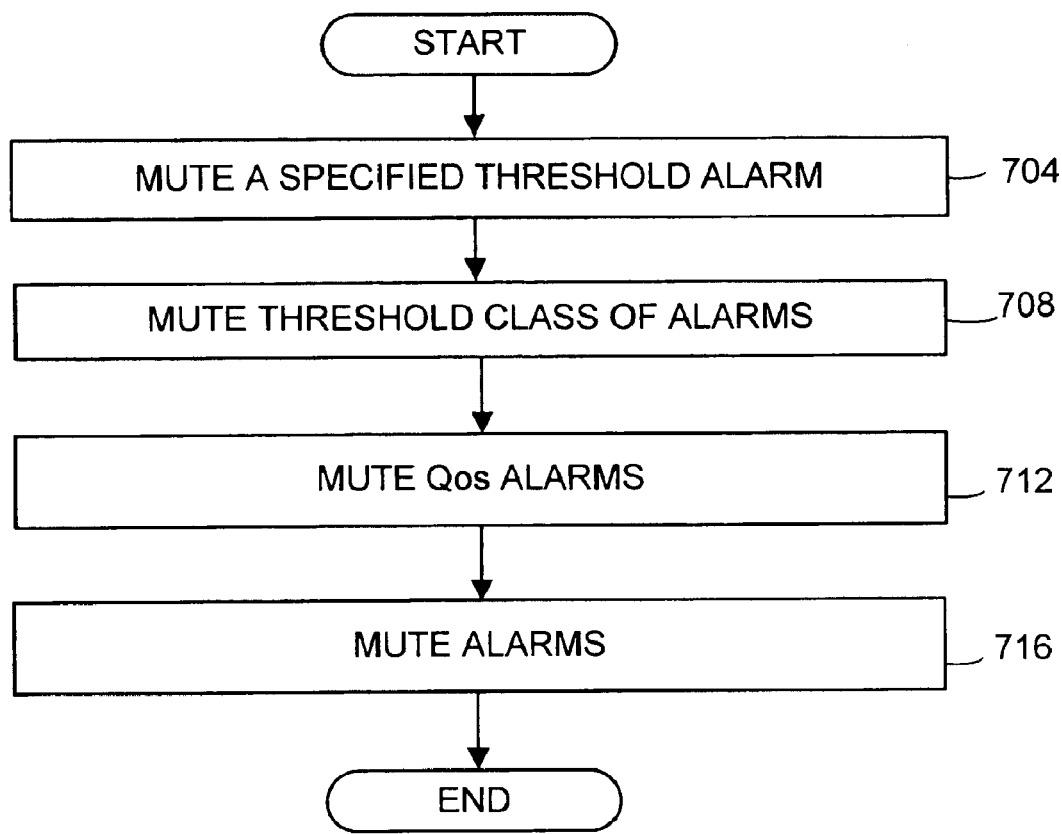
FIG. 7 is a flow chart that illustrates an alternate embodiment of an inventive method for reducing an event flow rate in a network.

FIG. 7 is a flow chart that illustrates an alternate embodiment of an inventive method for reducing an event flow rate in a network. Once the element management system determines that an event flow rate has surpassed a defined threshold, it examines a log of received alarms to determine the most common specific type of alarm. Thereafter, it instructs the cross connect network element transmitting the greatest number of the specified alarms to stop transmitting that particular alarm (step 704). If the event flow rate continues to be too high, the element management system will generate a message to prompt the cross connect network element to stop sending that category of alarm (step 708). For example, if the specified type of alarm which was silenced in step 704 was one of the 33 types of threshold alarms, then the category of alarms, namely the threshold alarms, are muted from the one cross connect network element in step 708.

If the event flow rate from that particular cross connect network element is still too high, then the element management system instructs the offending cross connect network element to mute all QoS types of alarms (step 712). Finally, if the event flow rate is still too high, the element management system 104 commands the offending cross connect network element to stop generating alarms at all (step 716). As may be seen, a method illustrated in FIG. 7 provides for a graduated set of responses according to the numbers and types of alarms being generated by the cross connect network element that has the excessively high event flow.

The method of FIG. 7 may be modified in other ways as well. For example, after step 708 in which specified types of QoS alarms are muted, the element management system can instruct the cross connect network element generating the second highest number of event flows to stop transmitting either a specified alarm or a specified type of alarm, for example, the threshold alarms, prior to taking the more drastic step of instructing the first cross connect network element to mute all quality of service alarms. Other variations to reduce the overall event flow rate to the element management system from each of the cross connect network elements 106 of FIG. 1 may be implemented.

The disclosed invention is particularly advantageous in that it allows an element management system to mute or partially mute a network element that is generating large numbers of non-critical alarms. Thus, the network's operation is not degraded and threatened with a major failure based on excessive traffic congestion due to the large number of alarms that may be generated as a result of a particular event.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method for managing a plurality of network elements, comprising:

receiving a plurality of alarms from each of the plurality of network elements, wherein the alarms belong to various types;

determining which of the plurality of network elements is generating the greatest number of alarms; and instructing the network element generating the greatest number of alarms to stop transmitting the alarms.

2. The method of claim 1 wherein the network element is instructed to not transmit a particular type of alarm for a predetermined period of time.

3. The method of claim 2 wherein the particular type of alarm comprises a threshold type alarm operable to be compared against an event flow rate associated therewith.

4. The method of claim 2 wherein the particular type of alarm comprises a quality of service (QoS) alarm.

5. The method of claim 2 wherein the network element instructed to stop transmitting the particular type of alarm is operable to store the particular type of alarm for the predetermined period of time.

6. The method of claim 5 further comprising the step of instructing the network element to retransmit the particular type of alarm after expiration of the predetermined period of time.

7. The method of claim 1 wherein the network element is allowed to retransmit the alarms depending on satisfying an event flow rate condition associated therewith.

8. The method of claim 1 wherein the step of instructing the network element to stop transmitting the alarms comprises instructing the network element to stop transmitting the alarms based on a predetermined precedence of suspension relating to the types of alarms.

9. An element management system, comprising:

a processor;

a transceiver operable to be coupled to a plurality of network elements, wherein each network element is operable to transmit alarm signals to the element management system, the alarm signals relating to various types of alarms generated in the network elements; and a store for storing computer instructions that define operational logic of the element management system, the computer instructions, upon execution by the processor, for prompting the element management system to issue a signal to a network element to cause it to stop sending alarm signals based on a predetermined precedence of suspension of transmission.

10. The element management system of claim 9 wherein the computer instructions prompt the processor to send a signal to the network element to instruct it to stop sending alarm signals relating to only a specific type of threshold crossing alarm.

11. The element management system of claim 9 wherein the computer instructions prompt the processor to send a signal to the network element to instruct it to stop sending alarm signals relating to all threshold crossing alarms.

12. The element management system of claim 9 wherein the computer instructions prompt the processor to send a signal to the network element to instruct it to stop sending alarm signals relating to all quality of service (QoS) alarms.

13. The element management system of claim 9 wherein the Computer instructions prompt the processor to send a signal to the network element to instruct it to stop sending alarm signals based on a precedence of suspension determined in the following order:

specified types of threshold alarms;

all threshold alarms;

all QoS alarms; and all alarms.

14. The element management system of claim 9 wherein the computer instructions prompt the processor to send a signal to the network element to instruct it to stop sending alarm signals relating to threshold crossing alarms and quality of service (QoS) alarms such that the threshold crossing alarms are suspended prior to the QoS alarms.

15. A method of managing alarm signal flow generated by a plurality of network elements, the method comprising:

monitoring alarm signals by an element management system coupled to the plurality of network elements, wherein the alarm signals are transmitted by each network element and relate to various types of alarms generated thereat; and instructing a network element by the element management system to suspend transmission of the alarm signals based on a predetermined order of precedence, if the alarm signal flow from the network element exceeds a flow rate associated therewith.

16. The method of claim 15 wherein a network element is instructed by the element management system to not transmit alarm signals relating to a particular type of alarm for a predetermined period of time.

17. The method of claim 15 further comprising the step of instructing a network element by the element management system to retransmit the alarm signals after the network element was initially instructed to not transmit the alarm signals.

18. The method of claim 15 wherein the predetermined order of precedence for suspending transmission comprises the following order: specified types of threshold alarms; all threshold alarms; all quality of service (QoS) alarms; and all alarms.

* * * * *